Figure 1:
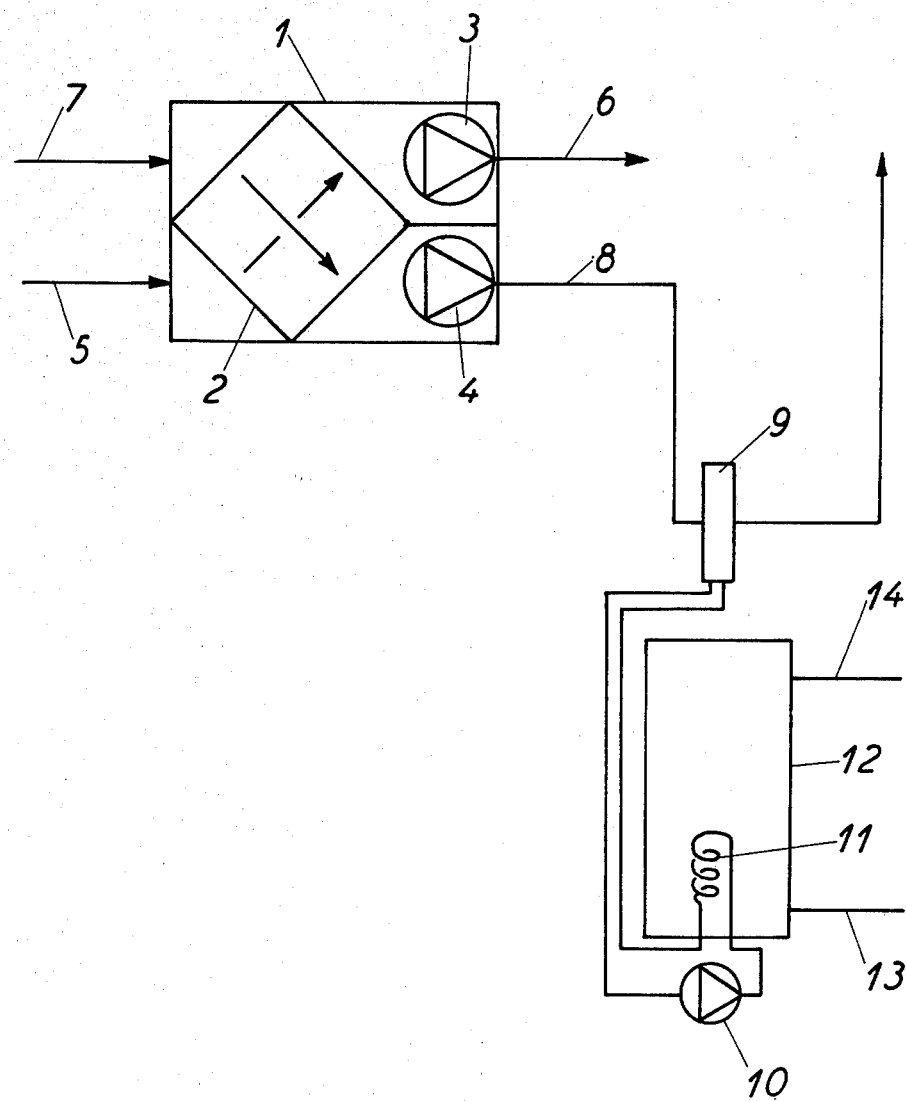

United States Patent [19]

Svendsen

[11] 4,389,857
[45] Jun. 28, 1983

[54] HEAT EXCHANGER

[75] Inventor: Biarne R. Svendsen, Copenhagen, Denmark

[73] Assignee: Genvex Energiteknik A/S, Denmark

[21] Appl. No.: 253,934

[22] PCT Filed: Aug. 21, 1980

[86] PCT No.: PCT/DK80/00049
  § 371 Date: Apr. 21, 1981
  § 102(e) Date: Apr. 14, 1981

[87] PCT Pub. No.: WO81/00616
  PCT Pub. Date: Mar. 5, 1981

[30] Foreign Application Priority Data

Aug. 21, 1979 [DK] Denmark .................... 3482/79

[51] Int. Cl.³ .............................................. F25B 29/00
[52] U.S. Cl. .................................. 62/325; 62/238.6; 62/412
[58] Field of Search ............... 62/238.6, 325, 412

[56] References Cited

U.S. PATENT DOCUMENTS

| | | | |
|---|---|---|---|
| 2,118,949 | 5/1938 | Scott | 62/412 X |
| 2,150,224 | 3/1939 | Hull | 62/238.6 X |
| 2,696,085 | 12/1954 | Ruff | |
| 2,716,866 | 9/1955 | Silva | 62/238.6 X |
| 3,500,655 | 3/1970 | Lyons | 62/325 X |
| 3,517,527 | 6/1970 | Bouchat | 62/325 |
| 3,995,446 | 12/1976 | Eubank | |
| 4,071,080 | 1/1978 | Bridgers | 62/412 X |
| 4,100,763 | 7/1978 | Brody | 62/412 X |
| 4,173,872 | 11/1979 | Amthor, Jr. | 62/238.6 |
| 4,244,193 | 1/1981 | Haakenson | 62/412 X |
| 4,305,260 | 12/1981 | Backlund | 62/325 X |

FOREIGN PATENT DOCUMENTS

| | | |
|---|---|---|
| 861743 | 7/1949 | Fed. Rep. of Germany . |
| 853202 | 10/1952 | Fed. Rep. of Germany . |
| 2255592 | 5/1973 | Fed. Rep. of Germany . |
| 2619744 | 11/1977 | Fed. Rep. of Germany . |
| 1284416 | 1/1962 | France . |
| 60262 | 1/1939 | Norway . |
| 138784 | 11/1978 | Norway . |
| 157084 | 12/1956 | Sweden . |
| 599510 | 5/1978 | Switzerland . |
| 1360064 | 7/1974 | United Kingdom . |

Primary Examiner—Lloyd L. King
Attorney, Agent, or Firm—George H. Gerstman

[57] ABSTRACT

In a heat exchanger of the kind used for the transfer of heat from exhaust air, e.g. from rooms, to fresh air to be led into rooms, or for the transfer of heat the opposite way, means (9) for the cooled exhaust air are arranged after the outlet (4) with a view to transferring heat from the exhaust air to a heat reservoir (12), i.e. a heat pump circuit (10, 11). The thermodynamic efficiency is dependent on the difference in temperature, of course, and by transferring heat from exhaust air to for instance a water tank for hot water, the temperature being in some places close to the flow temperature of tap water, it will be possible to make use of much more of the latent heat of the exhaust air.

6 Claims, 9 Drawing Figures

HEAT EXCHANGER

The invention relates to a heat exchanger in a house foreseen for the transfer of heat from exhaust air into fresh air to be supplied to the house or the transfer of heat the opposite way whereby means for further colling the exhaust air are mounted after the outlet of the cooled exhaust air which means comprises a heat pump circuit.

A heat exchanger of that kind is known from the specification of Swiss Pat. No. 599 510 according to which the heat exchanger is used for the recovery of the heat of the air flowing out from the ventilating plant of a swimming bath. The means for further cooling the exhaust air after the heat exchanger itself comprises a liquid circulating system intended to lead the heat from the exhaust air to a heat pump system by which the heat is led to another liquid circulating system transporting the heat to the place of use. Thus, four spots having heat transferring surfaces plus a heat pump circuit cause efficiency of heat transfer. And, thus, the total efficiency will be the product of five efficiencies.

The present invention is related to a development of the known heat exchanger, and the heat exchanger according to the invention is characteristic in that an evaporator is arranged in the flow of the exhaust air and that the condenser complete is placed in a water tank which is a tank holding hot tap water for the house.

Hereby only one heat pump circuit is required which is just possible as the condenser is placed in a relatively cold place, i.e., preferably at the bottom of the tank at the inlet for cold water. By such simple means it is possible to achieve good efficiency of the heat pump circuit either when temperature of the exhaust air is high or when there is cold water around the condenser and especially in the event of both, i.e., during firing periods. It is well-known that the higher difference of temperature worked with the higher the efficiency of a thermodynamic process. The heat produced by the heat pump unit as waste heat stays in the house, of course, and is utilized for heating. When the efficiency of the systems gets too low, i.e., when the difference of temperature between exhaust air and the water around the condenser is low, the present invention makes it possible to disconnect the heat pump circuit or stop it, whereby is contributed to improvement of the total efficiency of the heat exchanger. All things considered it is demonstrated that with the present construction it is possible to achieve very fine results for instance in a self-contained house using an average amount of hot water under Danish climatic conditions. During firing periods it will be possible that the temperature of the air led into the atmosphere is only about that of the outdoor air, and thus there will be no losses. Therefore, this invention points to a heat exchanger which without serious losses offers constant renewal of the air in a house or an apartment housing a family.

Although it is indicated in the specification of the Swiss Pat. No. 599 510 mentioned that the art known therefrom is applicable for the heating of tap water, it does not mention the very simple means according to the present invention for achievement.

One embodiment of the invention is characteristic in that after the outlet for fresh air an evaporator is arranged, which is connected to the water tank in the same way as the first evaporator. This makes it possible to use the heat exchanger as an air-conditioning plant in summer when outdoor temperature is higher than indoor temperature. In that case and according to the invention, the two evaporators may be characteristic in that both evaporators are connected to the same heat pump circuit in a way leaving it optional whether one or the other evaporator is connected to the circuit. Thus, only one heat pump circuit is required.

Finally, the heat exchanger may be characteristic in that it is a cross-flow heat exchanger having vanes or plates arranged to let the exhaust air pass once whereas it is arranged to let the suction air pass once through one half of the plates and then once through the other half of the plates. This makes it possible to use the same fans and fan motors for suction air and exhaust air respectively. During passage through the heat exchanger and past the evaporator changes of state of condition and thus changes of pressure of the air will of course occur. As only one evaporator will normally be in use, i.e., during firing periods, viz. the one placed in the exhaust passage, wrong distribution of the pressure would result. By this embodiment the drawback is overcome.

The invention is explained with reference to the drawing where

Figure 2:
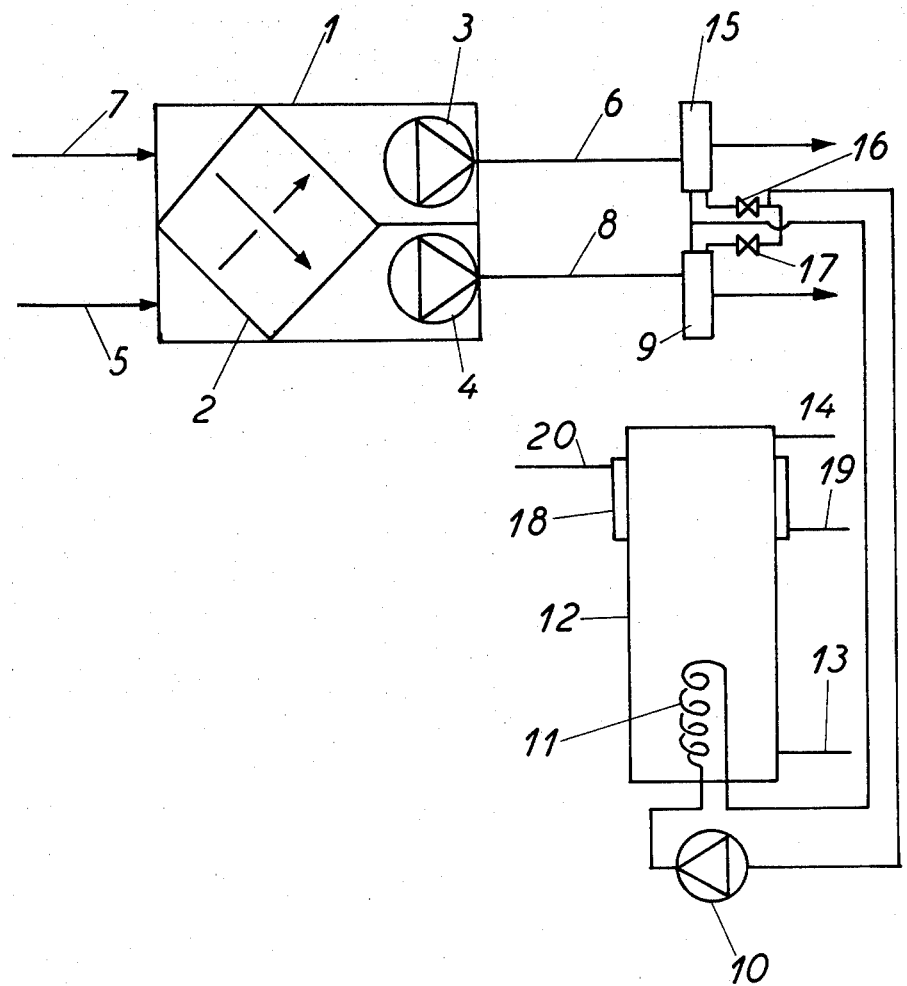
Figure 3:
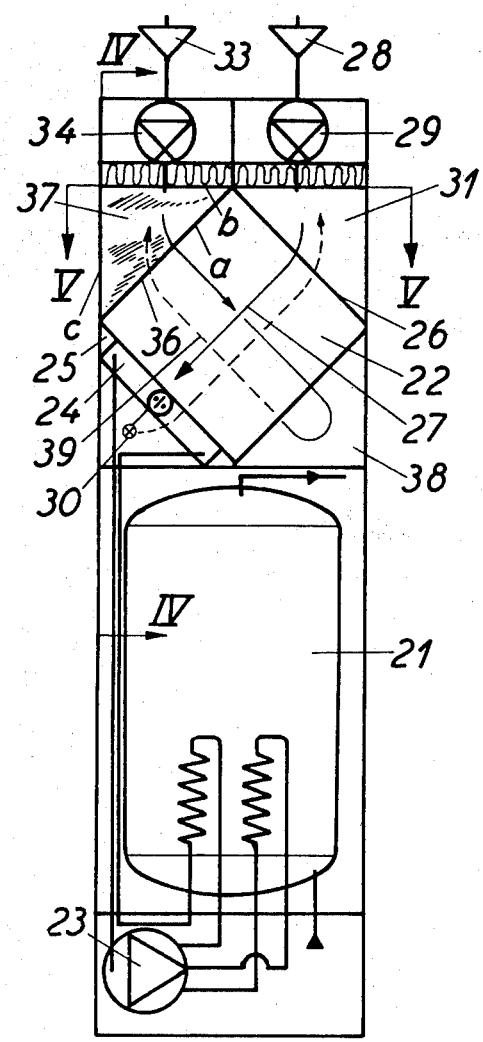
Figure 4:
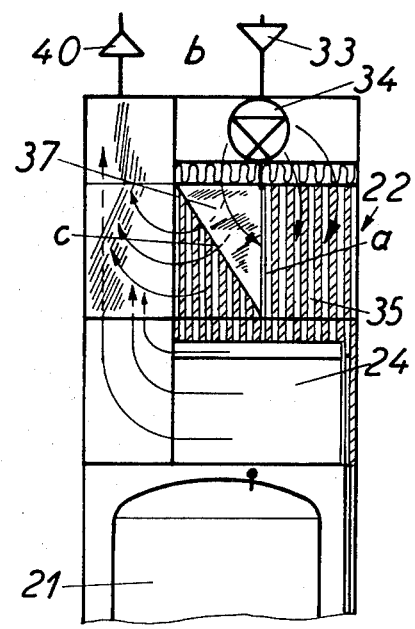
Figure 5:
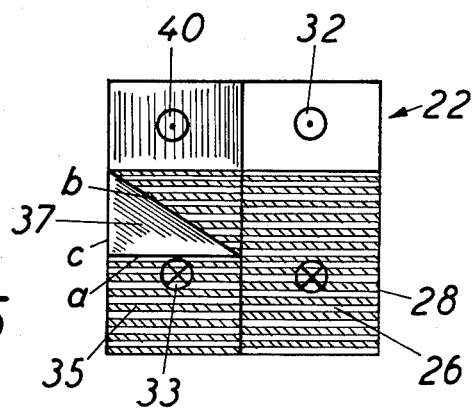
Figure 6:
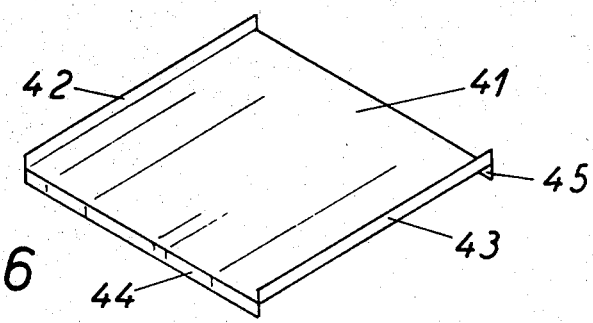
Figure 7:
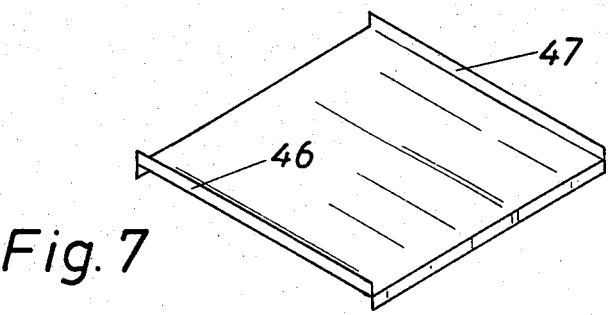
Figure 8:
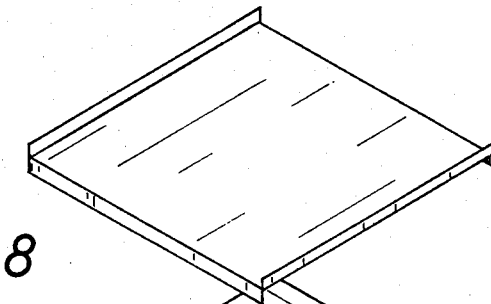
Figure 9:
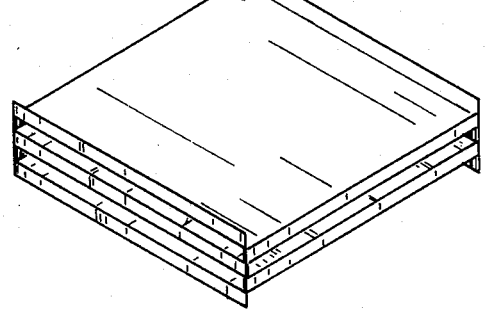

FIG. 1 schematically shows an embodiment of a heat exchanger according to the invention, FIG. 2 a development according to the invention, FIG. 3 an embodiment of a heat exchanger according to the invention built together with a heat pump system and a hot-water tank into a box-shaped unit schematically seen from in front and one front plate having been removed, FIG. 4 a section along the line IV—IV of FIG. 3, FIG. 5 a section along the line V—V of FIG. 3, FIGS. 6, 7, and 8 a so-called "exploded" view of FIG. 9 shows part of a plate heat exchanger of which FIGS. 6, 7, and 8 show the three lower plates, FIG. 8 showing the bottom one, FIG. 7 the bottom plate but one, and FIG. 6 the third from the bottom.

In FIG. 1 is shown a box-shaped unit 1 containing a so-called cross-flow heat exchanger 2 for air and two fans 2 and 4. The fan 3 sucks fresh air from an inlet 5 through the heat exchanger 2 and blows it out through an outlet 6, whereas the fan 4 sucks exhaust air from a room from another inlet 7 through the heat exchanger 2 and blows it out through an outlet 8. In the outlet 8 an evaporator 9 is arranged forming part of a heat pump circuit consisting of a compressor 10 and a condenser coil 11 arranged in a water tank 12 with an inlet 13 and an outlet 14. Often, the tank 12 will be placed at some distance from the other elements of the constructions, and in that case the pipes will be insulated.

Now, the heat exchanger operates in the following manner provided that the fresh air is colder than the exhaust air which will be the case in winter. The exhaust air sucked in through the inlet 7 will liberate heat in the cross-flow heat exchanger 2, which is in part, i.e. with a certain efficiency, transferred to the fresh air sucked in through the inlet 5. The heated fresh air is blown through the outlet 6 to rooms not shown whereas the cooled exhaust air is led through the outlet 8 for further cooling when passing the evaporator 9 before being led into the open air. The heat removed by the evaporator 9 is by the compressor 10 pumped into the tank 12 where it will through the condenser coil 11 liberate into the water preferably in the coldest water at the bottom and near the inlet 13.

FIG. 2 shows a development of the heat exchanger according to FIG. 1 and where the elements of the construction shown again carry the same reference numbers. The difference consists in a further evaporator 15 having been built into the outlet 6 connected parallelly to the other evaporator 9 and valves 16 and 17 being arranged in the heat pump circuit making it possible to switch on one evaporator or the other. In case of the outdoor temperature being higher than that of the rooms to be supplied with fresh air, and the evaporator 15 being on, it will be possible to cool the fresh air before it is led into the rooms, and at the same time the water in the tank 12 is heated. The heat exchanging in the cross-flow heat exchanger 2 will in that case be in the opposite direction.

In both cases the heat collected by evaporators 9 and 15 is the heat not transformed in the cross-flow heat exchanger 2 as its efficiency will never be 100%.

Around the tank may be arranged a jacket 18 with an access 19 and an exit 20. The heat exchanger thus established is applicable for heating.

FIGS. 3, 4, and 5 are to be look upon in combination, and the items of these three figures carry the same reference numbers.

FIG. 3 shows a unit in which a hot water tank 21 is arranged. Above the tank a box-shaped plate heat exchanger 22 of square section is arranged on its edge. The hot water tank 21 and the plate heat exchanger 22 are inter-connected by a heat pump system consisting of a heat pump 23 and an evaporator 24 arranged along one of the fan sides 25 in the heat exchanger. Along the same side cooled air from the room is flowing, the air being let in through the opposite, rectangular side 26, see arrow 27 in FIG. 3 and arrow 28 in FIGS. 3 and 5. The air is supplied by a fan 29 which is connected with a room in a house. When passing through the heat exchanger 22 and the evaporator 24 the air is cooled to a temperature which will often be only a couple of degrees above temperature of atmosphere. After the evaporator 24 the air is led into the atmosphere as shown by arrows 30, 31, and 32.

Fresh atmospheric air is taken in through an inlet 33 and led through a fan 34 towards one half 35 of the side 36 of the heat exchanger 22 at which side 36 a triangular screen 37 is arranged. In order to clearly show the position of the triangular screen 37 its sides carry the references a, b, and c in the three figures. When the fresh air has flown through half of the heat exchanger 22 it will reach the room 38 which is a closed room. From there it is pressed through the other half of the heat exchanger as shown by dotted arrow 39, and the air will come out on the other side of the triangular plate 37, thus. In this room heating elements—not shown for the sake of clearliness—are arranged. The air is led into the room of the house through the outlet 41.

FIG. 6 shows a square plate 41 having two upward bent edges 42 and 43 opposite each other, and two downward bent edges 44 and 45. FIG. 7 shows the same but rotated 90° and the two upward bent edges 46 and 47 being intended for adhesion to the edges 44 and 45 respectively. Adhesion according to this principle makes it possible to build a plate heat exchanger as shown in FIG. 9 and applicable in the construction according to FIGS. 3, 4, and 5.

The invention is widely variable. Thus, it is clear that in principle the cross-flow heat exchanger 2 may be a heat exchanger of any kind. For the sake of clearliness, no throttles are shown in the heat pump and cooling circuits shown, but of course there are such throttles.

I claim:

1. A heat exchanger system in a house arranged for the transfer of heat from exhaust air into fresh air to be supplied to the house or the transfer of heat in the opposite manner comprising means for creating a flow of exhaust air from the interior of the house, means for further creating a flow of fresh air from the outside to the interior of the house, means arranged to receive said exhaust flow and create a heat exchange relationship with the flow of fresh air, means connected downstream of said heat exchanger means for further cooling the flow of exhaust air exiting therefrom said further cooling means includes a heat pump circuit, said heat pump circuit having an evaporator being arranged in the flow of the exhaust air from said heat exchanger means and a condenser operatively connected to said evaporator and wholly submerged in the water of a water tank which is a tank holding hot tap water for the house, said condenser heating the tap water of the tank in response to the action of said condenser cooling the flow of exhaust air.

2. A heat exchanger according to claim 1, whereby the inlet for cold water supplying the tap water is placed at the bottom of the tank, said condenser is further placed at said bottom.

3. A heat exchanger according to claim 1 or 2 further including means for connecting and disconnecting the heat pump circuit on demand.

4. A heat exchanger according to claim 1, 2 or 3, wherein said means for creating a flow of fresh air directs said outside air through said heat exchanger means, a second evaporator arranged to receive the flow of fresh air exiting from said heat exchanger for further cooling, and said second evaporator being connected to a condenser wholly submerged in the water of the water tank.

5. A heat exchanger according to claim 4, wherein both of said evaporators are connected to the same heat pump circuit, and means connected to said means for selectively operating said first and second evaporators of said pump circuit in a way leaving it optional whether one or the other evaporator is connected to the circuit.

6. A heat exchanger according to claim 1, wherein said heat exchanging means includes a cross-flow heat exchanger having a plurality of plates arranged to let the flow of exhaust air pass therethrough and arranged to let the flow of fresh air pass through one half of the plates to be directed to the interior of the house and then back through the other half of the plates, said flow of exhaust air and fresh air being accordingly arranged in heat exchange relationship.

* * * * *